(12) United States Patent
Brockhaus et al.

(10) Patent No.: US 7,194,918 B2
(45) Date of Patent: Mar. 27, 2007

(54) MAGNETOINDUCTIVE FLOWMETER AND METHOD FOR OPERATING A MAGNETOINDUCTIVE FLOWMETER

(75) Inventors: Helmut Brockhaus, Dinslaken (DE); Boudewijn Jozef Poortmann, Dordrecht (NL); Wilhelm Florin, Duisburg (DE); Arnould Leendert van Willigen, KC Capelle aan den Yssel (NL)

(73) Assignee: Krohne Messtechnik GmbH & Co. KG, Duisburg (DE)

( * ) Notice: Subject to any disclaimer, the term of this patent is extended or adjusted under 35 U.S.C. 154(b) by 41 days.

(21) Appl. No.: 11/213,576

(22) Filed: Aug. 26, 2005

(65) Prior Publication Data

US 2007/0044570 A1    Mar. 1, 2007

(51) Int. Cl.
*G01F 1/58* (2006.01)
(52) U.S. Cl. .................................................. 73/861.12
(58) Field of Classification Search ...................... None
See application file for complete search history.

(56) References Cited

U.S. PATENT DOCUMENTS

| | | | |
|---|---|---|---|
| 4,410,926 A | 10/1983 | Hafner et al. | |
| 5,369,999 A | 12/1994 | Yoshida | |
| 5,493,914 A | 2/1996 | Schafer | |
| 5,646,353 A | 7/1997 | Mesch et al. | |
| 6,634,238 B2* | 10/2003 | Budmiger | ................ 73/861.17 |

* cited by examiner

*Primary Examiner*—Harshad Patel
(74) *Attorney, Agent, or Firm*—Cesari & McKenna, LLP

(57) ABSTRACT

A magnetoinductive flowmeter and a method for operating same utilizing a measuring tube through which flows an electrically conductive medium, as well as two measuring electrodes and a magnet with two field coils positioned parallel to each other on mutually opposite sides of the measuring tube. The measuring electrodes are so positioned that their connecting line extends along an essentially perpendicular vector relative to the direction of flow and to the magnetic field as well as through the cross-sectional center of the measuring tube. For normal flow-measuring operation, the two field coils are so energized that an essentially homogeneous magnetic field is generated, permeating the medium flowing through the measuring tube, while for determining the flow rate the voltage present between the two measuring electrodes is collected at one or both measuring electrodes and measured against a reference potential. The normal flow-measuring operation is intermittently interrupted and the two field coils are energized in a manner as to generate an inhomogeneous magnetic field that permeates the medium flowing through the measuring tube, and the voltage present between the two measuring electrodes is collected. This permits a diagnosis of the flowmeter.

12 Claims, 1 Drawing Sheet

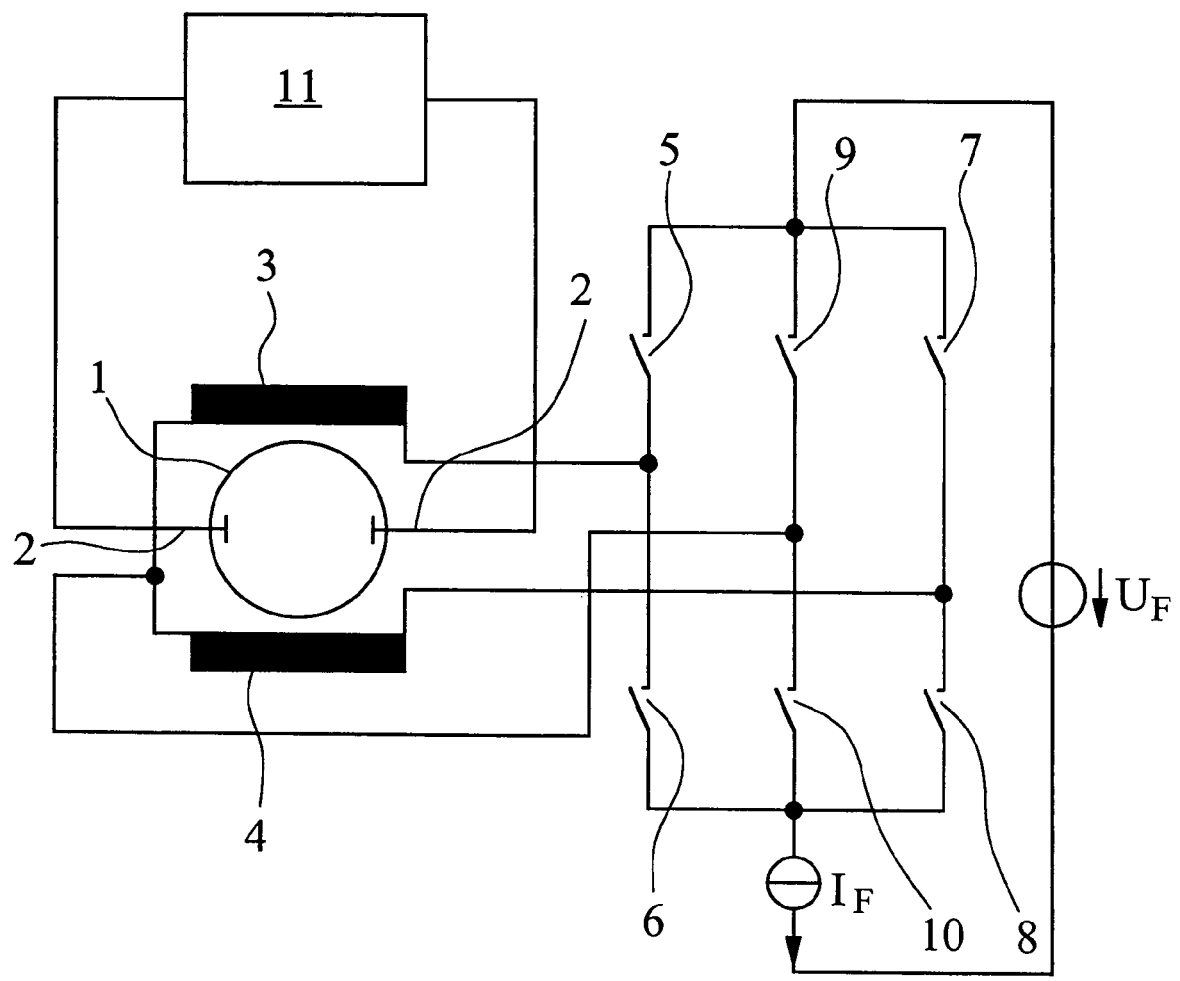

MAGNETOINDUCTIVE FLOWMETER AND METHOD FOR OPERATING A MAGNETOINDUCTIVE FLOWMETER

BACKGROUND OF THE INVENTION

1. Field of the Invention

This invention relates to a magnetoinductive flowmeter, encompassing a measuring tube for an electrically conductive medium flowing through it, as well as a magnet with two field coils, which field coils are connected in series for generating an essentially homogeneous magnetic field and, with the aid of a four-switch bridge circuit, are fed a periodically alternating field current equidirectionally flowing through the two field coils by virtue of the alternating opening and closing of two switch pairs, reversing the polarity of the field current. The invention also relates to a method for operating a magnetoinductive flowmeter, said flowmeter incorporating a measuring tube through which flows an electrically conductive medium, two measuring electrodes as well as a magnet with two field coils that are positioned parallel to each other on two opposite sides of the measuring tube and are thus capable of generating a magnetic field that extends in an essentially perpendicular plane relative to the direction of flow, while the measuring electrodes are positioned in a manner whereby their connecting line extends along an essentially perpendicular vector relative to the direction of flow and to the magnetic field and through the cross-sectional center of the measuring tube. In normal flow-measuring operation, the two field coils work in a way whereby an essentially homogeneous magnetic field is generated, permeating the medium as it flows through the measuring tube, its flow rate being determined by means of a voltage collected at one or both of the two measuring electrodes or between the two measuring electrodes under comparison with a reference potential.

2. The Prior Art

Magnetoinductive flowmeters and methods for operating magnetoinductive flowmeters of the type referred to above have been well-known for some time and are used in numerous different fields of application. The underlying concept of a magnetoinductive flowmeter for measuring the flow rate of a medium goes all the way back to Faraday who in 1832 suggested employing the principle of electrodynamic induction for flow-rate measurements.

According to Faraday's law of induction, a flowing medium that contains charge carriers and travels through a magnetic field will develop an electric field intensity perpendicular to the direction of flow and to the magnetic field. A magnetoinductive flowmeter utilizes Faraday's law of induction in that a magnet, generally consisting of two magnetic poles, each with a field coil, generates in the measuring tube a magnetic field perpendicular to the direction of flow. Within that magnetic field, each volume element of the flowing medium that contains a particular number of charge carriers contributes its intrinsically engendered field intensity to a voltage potential that can be collected at the measuring electrodes.

In conventional magnetoinductive flowmeters the measuring electrodes are designed for either direct-electrical or capacitive coupling with the flowing medium. Another salient characteristic of magnetoinductive flowmeters is the proportionality between the measured voltage and the flow rate of the medium averaged across the diameter of the measuring tube, i.e. between the measured voltage and the volumetric flow.

In the actual flow-measuring operation of a magnetoinductive flowmeter the general practice is to periodically alternate the magnetic field. Prior art has developed various approaches to that effect. For example, magnetoinductive flow measurements can be performed using an alternating field, in which case the field coils of the magnet are typically fed alternating current straight from a 50 Hz sinusoidal AC line system. However, transformation interference potentials and line noise can easily distort the flow-generated voltage between the measuring electrodes.

In more recent times, magnetoinductive flowmeters have predominantly employed a switched continuous field. A switched continuous field is obtained by feeding to the field coils of the magnet a current with a time-based, essentially square-wave pattern with periodically alternating polarity reversal. Another possibility is the use of a pulsating constant field which is obtained by only periodically supplying the field coils of the magnet with a sequentially timed square-wave current of always the same polarity. Still, the preferred method involves the periodic polarity reversal of the field current whereby a periodically alternating magnetic field is generated, in view of the fact that this polarity reversal of the magnetic field suppresses interferences such as electrochemical noise.

But then there are other disturbance variables that can affect the magnetoinductive flow measurement. Specifically, the flow measurement may be corrupted when the measuring tube is not completely filled, when the flow profile is inhomogeneous, when there are flaws in the field coils or in the circuitry of the magnet, or when magnetized deposits have accumulated, for instance, on the bottom of the measuring tube.

SUMMARY OF THE INVENTION

It is, therefore, the objective of this invention to introduce a method for operating a magnetoinductive flowmeter, and a corresponding magnetoinductive flowmeter, by means of which it is possible to diagnose the flowmeter and the flow-measuring operation.

Based on the above-described method for operating a magnetoinductive flowmeter, this objective is achieved by temporarily interrupting the normal flow-measuring operation and energizing the two field coils in a manner whereby an inhomogeneous magnetic field is generated and permeates the medium as it flows through the measuring tube, and by then tapping the voltage present between the two measuring electrodes.

Thus, according to the invention, the method employed involves a departure from the exclusive use of a homogeneous magnetic field. It interrupts the actual flow-measuring operation, which in the magnetoinductive flowmeter described here employs a homogeneous magnetic field, in order to create an inhomogeneous magnetic field.

Specifically, in a preferred embodiment of the invention, the inhomogeneous magnetic field extends in essentially symmetric fashion relative to the connecting line between the two measuring electrodes. In a particularly desirable implementation of the invention, this can be achieved, for instance, in that, during a normal flow-measuring operation, the field coils conduct an equidirectional and, preferably, an essentially equivalent current while during the interruption of the normal flow-measuring operation, the field coils generate an inhomogeneous magnetic field by conducting a counterdirectional but, preferably, an essentially equivalent current. However, it is not absolutely necessary for the current flowing through the field coils to be of the same potential for the homogeneous magnetic field and for the inhomnogeneous magnetic field.

The method implemented in the manner described generates a magnetic field with mutually opposite magnetic flux lines in the right and left halves of the measuring tube along the connecting line between the two measuring electrodes. As a result, only an extremely minor voltage differential, or none at all, can develop between the measuring electrodes. In the "ideal inhomogeneous" magnetic field with total symmetry between the upper and lower halves of the measuring tube, the magnetic field components along the connecting line between the two measuring electrodes will completely cancel each other, whereas a deviation from an "ideal inhomogeneous" magnetic field may still result in a residual magnetic field component due to which at least a certain potential difference exists between the two measuring electrodes.

Yet, the voltage that builds up between the two measuring electrodes when an inhomogeneous magnetic field is used also depends on other factors, especially those mentioned further above. Accordingly, it is important to determine whether the measuring tube is completely filled, whether there is a homogeneous flow profile, whether the field coils and the magnet circuitry work flawlessly and, finally, whether asymmetrically magnetized deposits have accumulated, for instance, in the lower half of the measuring tube.

An appropriate diagnosis of the magnetoinductive flowmeter and the associated flow-measuring method can be made based on the magnitude of the voltage generated when an inhomogeneous magnetic field is applied between the two measuring electrodes. Specifically, a preferred embodiment of the invention provides for the voltage collected between the two measuring electrodes during the interruption of the normal flow-measuring operation, serving to generate an inhomogeneous magnetic field, to be displayed and/or processed for the aforementioned diagnostic purposes. A preferred variation of the invention also provides for the possibility of a warning signal or message if and when the voltage collected between the two measuring electrodes during the interruption of the normal flow-measuring operation, serving to generate an inhomogeneous magnetic field, exceeds a predefined level. This alerts the user of the magnetoinductive flowmeter to the fact that at least one of the parameters in the operation of the magnetoinductive flowmeter is deviating from normal conditions, thus allowing for additional diagnostic functions that may be necessary for pinpointing the problem.

It follows that an inhomogeneous magnetic field generated during interruptions of the normal flow-measuring operation can be used for diagnostic purposes. In general, a corresponding diagnostic function may be employed at any time. In a preferred embodiment of the invention, the normal flow-measuring operation is interrupted repeatedly, preferably along a periodic pattern, to generate an inhomogeneous magnetic field, the preferred time intervals being between about 1 and 100 sec. Also, a preferred embodiment of the invention provides for the use of periodically alternating magnetic fields as explained above, with the normal flow-measuring operation interrupted, for generating an inhomogeneous magnetic field, in each case for a duration that corresponds to multiple integers, preferably 1 to 10 times the half-cycle of the magnetic fields.

In a preferred implementation, the method discussed can be further improved by ratioing the voltage collected between the two measuring electrodes during the interruption of the normal flow-measuring operation, serving to generate an inhomogeneous magnetic field, against the flow rate determined during the normal flow-measuring operation, comparing the ratio figure thus obtained with a calibration standard for that particular ratio, and displaying and/or processing any divergence between the two values. The display and/or processing of that divergence between the two ratio numbers will also serve diagnostic purposes and may be more accurate than in the case of the method described earlier which does not involve any ratioing, because real-world magnet circuits and real-word field coils of a magnetoinductive flowmeter are never flawless but are always plagued by tolerances, so that even under otherwise ideal conditions, it is virtually impossible to ever obtain a voltage of dead zero for an inhomogeneous magnetic field.

Therefore, given otherwise ideal conditions, the preferred embodiment of the invention here described provides for the determination of a calibration standard for the ratio between flow rate and voltage when using an inhomogeneous magnetic field. To that effect a determination is made, for instance as part of the factory calibration, of the flow rate with a homogeneous magnetic field and of the corresponding voltage with an inhomogeneous magnetic field. Using the ratio value thus obtained as the calibration standard, it is then possible to perform the diagnostic function during the flow-measuring operation of the magnetoinductive flowmeter. This comparison of the two ratio numbers may include a concomitant warning signal or message if and when the deviation between the two ratios exceeds a predefined value.

For a magnetoinductive flowmeter as described above, achieving the aforementioned objective through the generation of an inhomogeneous magnetic field is aided by providing a center tap between the two series-connected field coils, which center tap connects via a first auxiliary switch and a second auxiliary switch to the bridge circuit in such fashion that, during the alternating opening and closing of the respective two switches of the bridge circuit and of an auxiliary switch, the field coils are fed a periodically alternating field current that flows through the two field coils in opposite directions.

Using a bridge circuit with four switches for supplying the series-connected field coils with a periodically alternating current for reversing the polarity of the magnetic field by 180° in periodically alternating fashion has been an established practice in prior art. This invention now provides for the use of a center tap between the two series-connected field coils, coupled to the bridge circuit via two auxiliary switches. In a preferred embodiment of the invention, the switches of the bridge circuit that are simultaneously closed or opened for generating the homogeneous magnetic field are also opened and closed in alternating fashion for generating the inhomogeneous magnetic field.

Finally, as a specific feature in a preferred embodiment of the invention, an essentially symmetric inhomogeneous magnetic field is generated by positioning the field coils parallel to each other on mutually opposite sides of the measuring tube, permitting the generation of a magnetic field that extends in an essentially perpendicular plane relative to the direction of flow, and by providing two measuring electrodes so placed that their connecting line extends along an essentially perpendicular vector relative to the direction of flow and to the magnetic field as well as through the cross-sectional center of the measuring tube.

There are numerous ways in which the magnetoinductive flowmeter according to this invention, and the novel method for operating such a magnetoinductive flowmeter, can be configured and further enhanced. In this context, attention is invited to the dependent claims as well as to the following detailed description of a preferred embodiment of the invention with reference to the attached drawing.

BRIEF DESCRIPTION OF THE DRAWING

The sole FIGURE is a schematic illustration of a magnetoinductive flowmeter according to a preferred embodiment of the invention.

DESCRIPTION OF A PREFERRED EMBODIMENT

The preferred embodiment of a magnetoinductive flowmeter according to the invention, illustrated in the drawing, incorporates a measuring tube 1 through which flows an electrically conductive medium. Also provided are two measuring electrodes 2 serving to collect the voltage induced in the flowing medium. A magnetic field, permeating the measuring tube 1 and thus the flowing medium in a plane essentially perpendicular to the direction of flow, is generated by two field coils 3, 4 that are located parallel to each other on opposite sides of the measuring tube 1. The measuring electrodes 2 are so positioned that their connecting line extends along an essentially perpendicular vector relative to the direction of flow and to the magnetic field permeating the measuring tube 1, as well as through the cross-sectional center of the measuring tube 1.

The field coils 3, 4 are fed a field current by way of an expanded bridge circuit whose layout is explicitly shown in the drawing. As is evident from that figure, the bridge circuit features in conventional fashion four switches 5, 6, 7, 8, while the field coils 3, 4 are connected in series and so coupled to the bridge circuit that, operating in traditional fashion, the bridge circuit opens and closes the switches 5 and 8 and, respectively, the switches 6 and 7, whereby an identical field current flows through each of the two field coils 3, 4 in the same direction. It is a periodically alternating field current, i.e. its polarity is periodically reversed, the result being a periodically alternating, 180° polarity-reversed, homogeneous magnetic field permeating the measuring tube 1 and thus the medium flowing through the measuring tube 1. This constitutes the traditional operation of a magnetoinductive flowmeter for actual flow measurements. In conventional fashion, the voltage induced by the homogeneous magnetic field in the flowing medium is collected by the measuring electrodes, which in this case are conductively coupled to the electrically conductive medium, and is processed in an evaluation and display system 11.

In this case, the bridge circuit features two supplementary auxiliary switches 9, 10 which auxiliary switches 9, 10 are connected in series and the connection between these switches 9, 10 leads to a center tap between the two series-connected field coils 3, 4. At their respective other end the switches 9, 10 lead to the connection between the switches 5 and 7 and, respectively, to the connection between switches 6 and 8. The bridge circuit, thus expanded by the two switches 9, 10, can now be used for generating an inhomogeneous magnetic field as described below.

Instead of simultaneously closing the switch pair 5 and 8 and keeping the switch pair 6 and 7 open, and vice versa, producing a homogeneous magnetic field as explained above, the switches 5 and 7 jointly with switch 10 are held in an open state, while the switches 6 and 8 jointly with the auxiliary switch 9 are kept in the closed state, and vice versa. As a result, an identical field current, albeit only half the size of the field current used for generating the homogeneous magnetic field, will flow through the two field coils 3, 4 in opposite directions. The reduced field current and correspondingly reduced magnetic field nevertheless suffice for the intended diagnostic function.

For performing the diagnostic function in the preferred embodiment of the invention here described, the normal flow-measuring operation—i.e. the periodically alternating application of a homogeneous magnetic field and measuring of the voltage thus induced—is interrupted at periodic 1-minute intervals for the application of an inhomogeneous magnetic field. In a completely well-functioning magnetoinductive flowmeter, an inhomogeneous magnetic field is expected to deliver between the measuring electrodes 2 a collectible voltage potential of virtually zero. To that extent, a diagnosis of the magnetoinductive flowmeter is already possible by means of the voltage generated by the inhomogeneous magnetic field and collected via the two measuring electrodes 2.

The approach in this case, however, is to ratio the voltage collected between the two measuring electrodes 2 against the flow rate determined before during the normal flow-measuring operation and to compare the ratio number thus obtained with a calibration standard for that ratio, established earlier as part of the factory calibration. This comparison is performed by the evaluation and display system 11 that also performs the determination of the actual flow rate during the normal flow-measuring operation of the magnetoinductive flowmeter. The evaluation and display system 11 will compare the divergence between the two ratios against a predefined permissible maximum and, should that maximal deviation be exceeded, the evaluation and display system 11 will trigger a warning message indicating that an error has occurred in the magnetoinductive flow-meter. The user of the magnetoinductive flowmeter designed according to the preferred embodiment of the invention as described above will now have an opportunity to perform further diagnoses, for instance checking whether the measuring tube is not completely filled, the flow pattern is not consistent, the field coils or the magnet circuit are defective, or asymmetrically magnetized deposits have accumulated.

What is claimed is:

1. A method for operating a magnetoinductive flowmeter, said flowmeter including a measuring tube through which flows an electrically conductive medium, as well as two measuring electrodes and a magnet with two field coils, which field coils are positioned parallel to each other on mutually opposite sides of the measuring tube, thus permitting the generation of a magnetic field that extends in an essentially perpendicular plane relative to the direction of flow, and the measuring electrodes are so positioned that their connecting line extends along an essentially perpendicular vector relative to the direction of flow and to the magnetic field as well as through the cross-sectional center of the measuring tube, with the two field coils being so energized for the normal flow-measuring operation that an essentially homogeneous magnetic field is generated, permeating the medium flowing through the measuring tube, while for determining the flow rate, the voltage present between the two measuring electrodes is collected at one or both measuring electrodes and measured against a reference potential, said method comprising the steps of intermittently interrupting the normal flow-measuring operation, energizing the two field coils in a manner as to generate an inhomogeneous magnetic field that permeates the medium flowing through the measuring tube, and collecting the voltage present between the two measuring electrodes.

2. The method as in claim 1, including the additional step of causing the inhomogeneous magnetic field to extend in essentially symmetric fashion relative to the connecting line between the two measuring electrodes.

3. The method as in claim 1 or 2, including the step of during normal flow-measuring operation, causing the field coils to equidirectionally conduct a current, preferably of essentially the same magnitude, while during the interruption of the normal flow-measuring operation generating an inhomogeneous magnetic field so that a current, preferably of essentially identical magnitude, flows in the opposite direction through the field coils.

4. The method as in claim 1 or 2, including the step of reading out and/or processing for diagnostic purposes the voltage collected between the two measuring electrodes during the interruption of the normal flow-measuring operation, serving to generate an inhomogeneous magnetic field.

5. The method as in claim 4, including the step of triggering a warning message if and when the voltage collected between the two measuring electrodes during the interruption of the normal flow-measuring operation, serving to generate an inhomogeneous magnetic field, exceeds a predefined value.

6. The method as in claim 1 or 2, wherein for the generation of an inhomogeneous magnetic field, the normal flow-measuring operation is interrupted repeatedly, preferably at periodic intervals of 1 to 100 seconds.

7. The method as in claim 1 or 2, including providing periodically alternating magnetic fields and interrupting the normal flow-measuring operation in each case for the generation of an inhomogeneous magnetic field for a length of time that corresponds to multiple integers and preferably to 1 to 10 times the half cycle of the magnetic fields.

8. The method as in claim 1 or 2, including the steps of ratioing the voltage collected between the two measuring electrodes during the interruption of the normal flow-measuring operation for the purpose of generating an inhomogeneous magnetic field against the flow rate determined in normal flow-measuring operation, comparing the ratio value thus obtained with a calibration standard for that ratio and reading out and/or processing the divergence between the two ratio values.

9. The method as in claim 8, and triggering a warning message if and when the deviation between the two ratios exceeds a predefined value.

10. A magnetoinductive flowmeter, comprising a measuring tube through which an electrically conductive medium can flow, as well as a magnet with two field coils, which field coils are connected in series for the generation of an essentially homogeneous magnetic field and are fed a periodically alternating field current equidirectionally flowing through the field coils with the aid of a bridge circuit featuring four switches, whereby the alternating opening and closing of each pair of switches serves to reverse the polarity of the field current, wherein for generating an inhomogeneous magnetic field a center tap is provided between the two series-connected field coils which center tap is connected, via a first auxiliary switch and a second auxiliary switch, to the bridge circuit in such fashion that, as each pair of switches and an auxiliary switch are alternatingly opened and closed, the field coils are fed a periodically alternating field current flowing through the two field coils in the opposite direction.

11. The magnetoinductive flowmeter as in claim 10, wherein the switches of the bridge circuit that are simultaneously closed or opened for generating the homogeneous magnetic field, are alternatingly closed or opened for generating the inhomogeneous magnetic field.

12. The magnetoinductive flowmeter as in claim 10 or 11, wherein for the generation of an essentially symmetric inhomogeneous magnetic field, the field coils on mutually opposite sides of the measuring tube are positioned parallel to each other, thus permitting the generation of a magnetic field that extends in an essentially perpendicular plane relative to the direction of flow, and two measuring electrodes are provided and positioned in a manner whereby their connecting line extends along an essentially perpendicular vector relative to the direction of flow and to the magnetic field as well as through the cross-sectional center of the measuring tube.

* * * * *